United States Patent
Hawver et al.

(10) Patent No.: US 9,348,430 B2
(45) Date of Patent: May 24, 2016

(54) METHOD AND APPARATUS FOR TRANSITIONING IN-PROCESS APPLICATIONS TO REMOTE DEVICES

(75) Inventors: Bruce Hawver, Hawthorn, IL (US); Jacob Wolff-Petersen, Richmond (GB)

(73) Assignee: STEELSERIES ApS, Frederiksberg (DK)

( * ) Notice: Subject to any disclaimer, the term of this patent is extended or adjusted under 35 U.S.C. 154(b) by 1117 days.

(21) Appl. No.: 13/366,662

(22) Filed: Feb. 6, 2012

(65) Prior Publication Data

US 2013/0205206 A1    Aug. 8, 2013

(51) Int. Cl.
| | |
|---|---|
| *G06F 3/048* | (2013.01) |
| *G06F 19/00* | (2011.01) |
| *G06F 3/023* | (2006.01) |
| *G06F 3/038* | (2013.01) |
| *G06F 9/48* | (2006.01) |
| *A63F 13/40* | (2014.01) |
| *A63F 13/30* | (2014.01) |

(52) U.S. Cl.
CPC .............. *G06F 3/0238* (2013.01); *A63F 13/10* (2013.01); *A63F 13/12* (2013.01); *G06F 3/038* (2013.01); *G06F 9/485* (2013.01); *A63F 2300/204* (2013.01); *A63F 2300/538* (2013.01); *A63F 2300/6045* (2013.01); *A63F 2300/636* (2013.01)

(58) Field of Classification Search
CPC ... G06F 17/30864; G06F 21/51; G06F 21/57; G06F 21/577; G06F 3/04815; G06F 3/04842; G06F 3/0482; G06F 3/04847; G06F 3/0238; G09B 9/00; G09B 23/285; H04N 9/8042
See application file for complete search history.

(56) References Cited

U.S. PATENT DOCUMENTS

| | | | | |
|---|---|---|---|---|
| 6,139,433 | A * | 10/2000 | Miyamoto | A63F 13/02 345/474 |
| 7,178,111 | B2 * | 2/2007 | Glein | G06F 3/0481 715/782 |
| 9,118,737 | B2 * | 8/2015 | Mattingly | G06Q 10/10 |
| 9,235,319 | B2 * | 1/2016 | Finn | A63F 13/12 |
| 2004/0038708 | A1 | 2/2004 | Tsai et al. | |
| 2004/0153774 | A1 * | 8/2004 | Gavish | G06F 11/36 714/25 |
| 2004/0207719 | A1 | 10/2004 | Tervo et al. | |
| 2007/0021216 | A1 | 1/2007 | Guruparan | |

(Continued)

OTHER PUBLICATIONS

F. Barros, Modeling and simulation of mobile phones using dynamic topologies, Mar. 2012, 8 pages.*

(Continued)

*Primary Examiner* — Thuy Dao
(74) *Attorney, Agent, or Firm* — Guntin & Gust, PLC; Robert Gingher

(57) ABSTRACT

A method and apparatus that incorporate teachings of the present disclosure may include, for example, receiving at a mobile communication device a video stream from a computing device. The video stream is associated with images generated by a software application and is transmitted by the computing device responsive to a request to redirect control of the software application to the mobile communication device. The method may also include presenting the streamed video at the mobile communication device and transmitting to the computing device a stimulation of a remote user input function associated with the mobile communication device, where the transmitted stimulation corresponds to at least one action of a plurality of associable actions that can be executed by the software application. Additional embodiments are disclosed.

22 Claims, 9 Drawing Sheets

(56) References Cited

U.S. PATENT DOCUMENTS

| | | |
|---|---|---|
| 2007/0111801 A1 | 5/2007 | Haber et al. |
| 2009/0287468 A1* | 11/2009 | Lin ..................... G06F 17/5027 703/28 |
| 2010/0146573 A1 | 6/2010 | Richardson et al. |
| 2012/0159372 A1* | 6/2012 | Stallings et al. .............. 715/773 |
| 2012/0245918 A1* | 9/2012 | Overton et al. ................. 703/27 |
| 2012/0254791 A1* | 10/2012 | Jackson ................ G06F 3/0482 715/781 |
| 2013/0019023 A1* | 1/2013 | Hemed ................... H04L 43/50 709/231 |
| 2014/0143687 A1* | 5/2014 | Tan ....................... G06F 3/1462 715/757 |
| 2015/0128091 A1* | 5/2015 | Laubach ............. G06F 3/04812 715/810 |

OTHER PUBLICATIONS

K. Leichtenstern et al., Using the hybrid simulation for early user evaluations of pervasive interactions, Oct. 2010, 10 pages.*

* cited by examiner

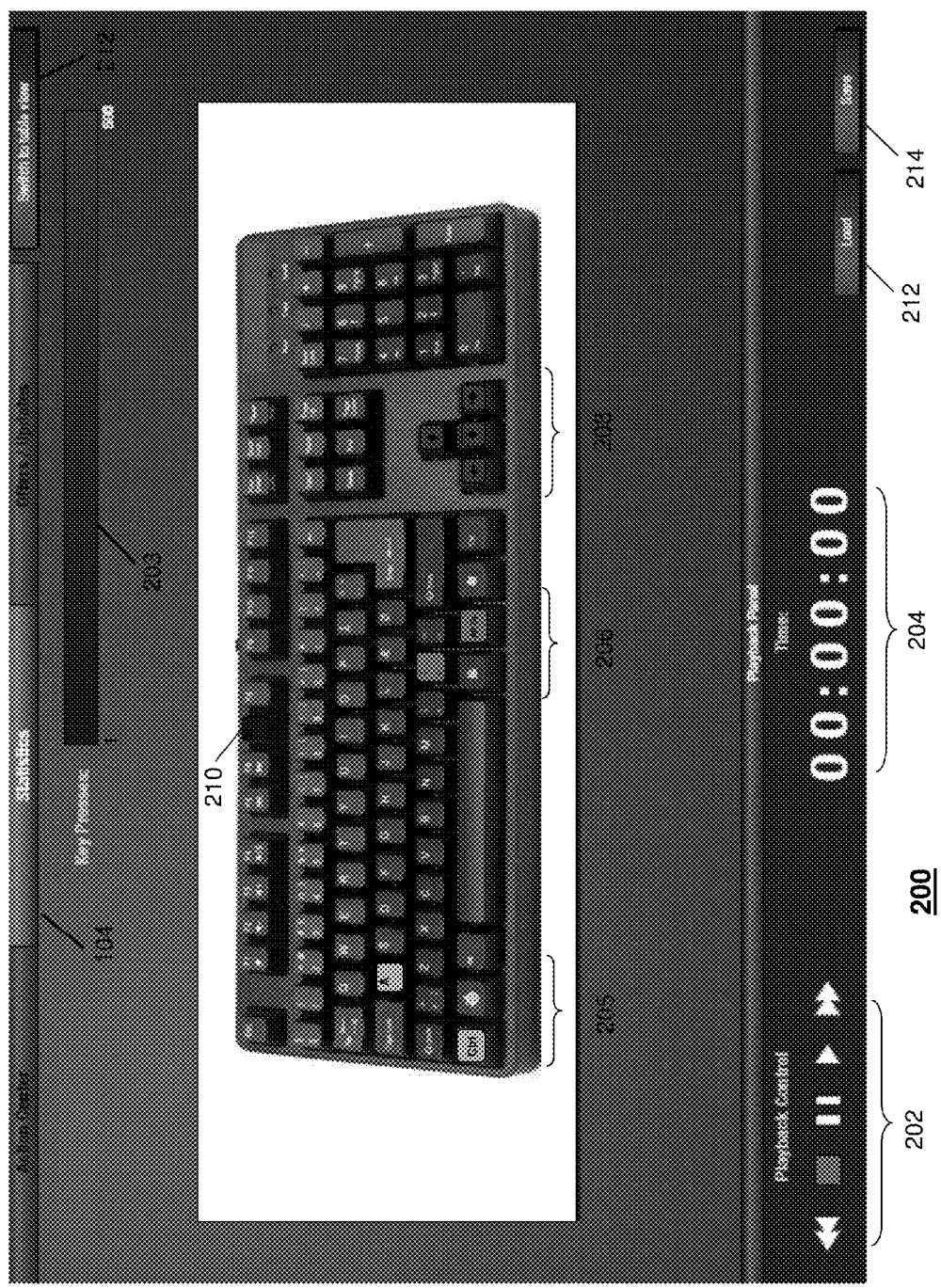

| Key | Time | Key presses |
|---|---|---|
| → | 04:16:15 | 493 |
| ← | 04:33:16 | 479 |
| ↓ | 03:52:39 | 455 |
| ↑ | 03:32:11 | 403 |
| Alt . | 00:02:16 | 311 |
| Ctrl A | 00:01:22 | 265 |
| F7 | 00:00:2 | 1 |

Usage Suggestions

- Consider replacing <Alt .> with a macro triggered by <Ctrl F> to improve response time and free the user's right hand for other tasks. The "Ctrl" key on the left side of the keyboard can be held down while the user's fingers toggle between the "A" and "F" keys.
- Alternatively, consider creating single button macros for <Ctrl A> and <Alt .> which can be assigned to keys on the keyboard or left-right buttons on a mouse.
- ...

METHOD AND APPARATUS FOR TRANSITIONING IN-PROCESS APPLICATIONS TO REMOTE DEVICES

FIELD OF THE DISCLOSURE

The present disclosure relates generally to an apparatus for transitioning in-process applications to mobile devices.

BACKGROUND

Electronic software, particularly gaming software, is commonly played on personal computers and gaming systems. Players typically interact with gaming software using display screens physical accessories such as a keyboard, a general purpose gaming pad, a mouse, a gaming console controller, a headset with a built-in microphone to communicate with other players, a joystick, a computer display, or other common gaming accessories. Gamers commonly use such accessories to enjoy the gaming experience from their homes while participating in the gaming experienced generated and displayed on their gaming systems. Communication systems allow computing devices to remotely share aspects of gaming software simulations.

BRIEF DESCRIPTION OF THE DRAWINGS

FIGS. 1, 2, and 3 depict illustrative embodiments of a Graphical User Interface (GUI) generated by an Accessory Management Software (AMS) application according to the present disclosure;

DETAILED DESCRIPTION

Figure 1:
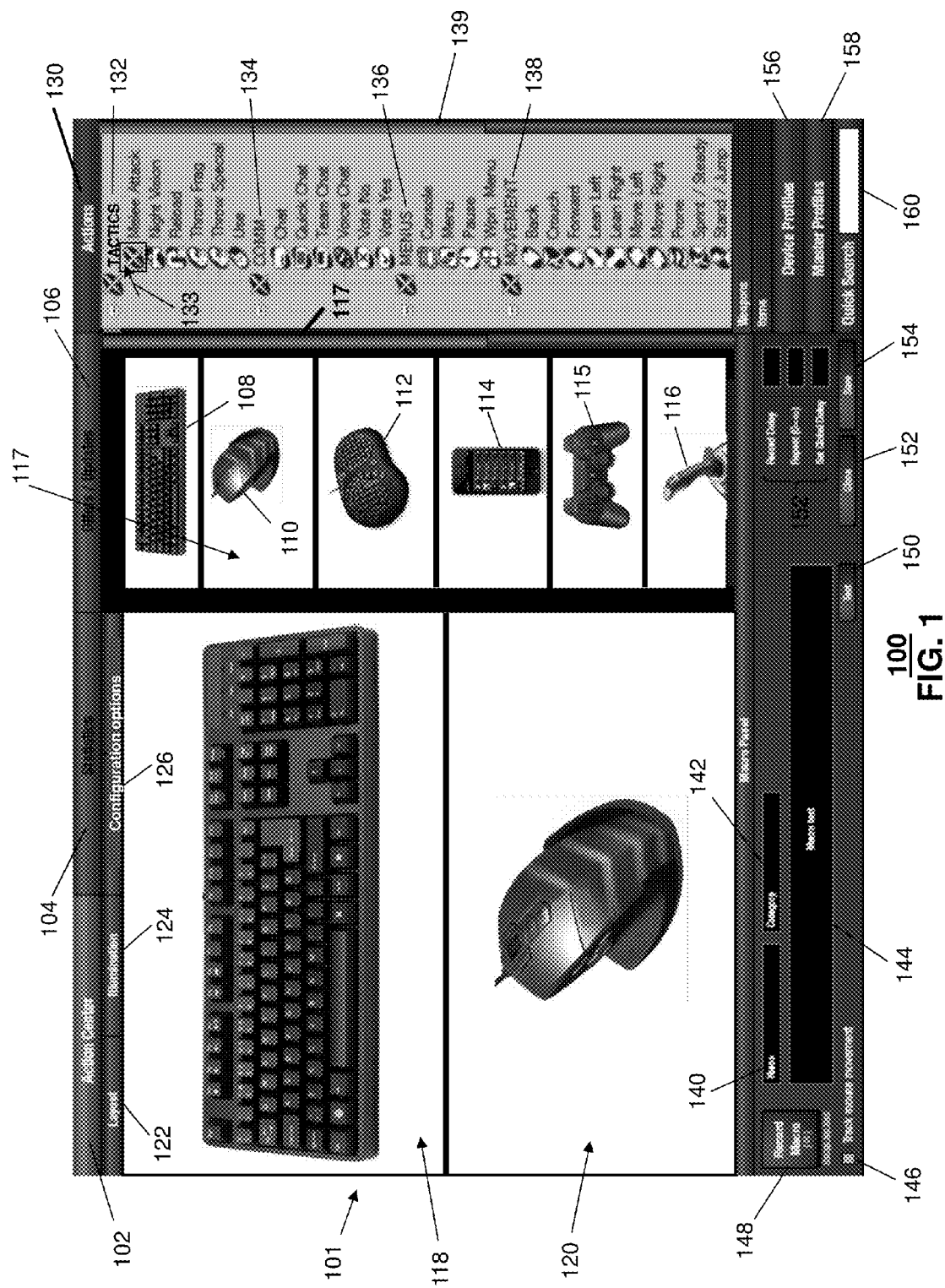

One embodiment of the present disclosure includes a computer-readable storage medium including computer instruction, which when executed by a processor, can cause the processor to process a software application at a computer device. The computer instructions can detect a request to pause the software application at the computer device and, in turn, halt processing of the software application at the computer device responsive to the detected request to pause. The computer instructions can further receive from the mobile communication device a request to resume the software application and restart processing of the software application at the computer device responsive to the received request to resume the software application. The computer instructions can also transmit a graphical user interface associated with the software application to the mobile communication device. The computer instructions can receive from the mobile communication device a request to resume the software application and, in turn, restart processing of the software application at the computer device in response to the received request to resume. The computer instructions can detect a stimulation of a remote user input function at the mobile communication device. The computer instructions can further retrieve at the computer device at least one action of a plurality of associable actions responsive to the detected stimulation. The one action can correspond to the received stimulation. In turn, the computer instructions can provide the retrieved action to an operating system of the computer device for use in the software application.

One embodiment of the present disclosure includes a computer device including a memory coupled to a processor. The memory includes computer instructions, which when executed by the processor can configure the processor to facilitate communications with a software application. The computer instructions can detect a request to transfer navigation and control of the software application to a mobile communication device and, in turn, establish a communication link between the computing device and the mobile communication device in response to the detected request. The computer instructions can also detect a stimulation of a remote user input function associated with the mobile communication device by way of the communication link to control the software application. The computer instructions can further provide the software application stimulation data associated with the detected stimulation.

One embodiment of the present disclosure includes a method including receiving at a mobile communication device a video stream from the computing device. The video stream can be associated with images generated by a software application. The video stream can also be transmitted by the computing device responsive to a request to redirect control of the software application to the mobile communication device. The method can also include presenting the streamed video at the mobile communication device. The method can further include transmitting to the computing device a stimulation of a remote user input function associated with the mobile communication device. The transmitted stimulation can correspond to at least one action of a plurality of associable actions that can be executed by the software application.

FIGS. 1-3 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, a gaming server, or a gaming console. A gaming console can represent a gaming box such as a PlayStation 3™ a Wii™, or an Xbox360™. Other present and next generation gaming consoles are contemplated. The AMS application can also operate in other computing devices with less computing resources such as a cellular phone, a personal digital assistant, or a media player (such as an iPod™, an iPAD™ etc.). From these illustrations it would be apparent to an artisan with ordinary skill in the art that the AMS application can operate in any device with computing resources.

The AMS application can be applied to a method and an apparatus for a distributed computing system. The AMS application can operate at any device or at any combination of devices across a distributed system to allow user access to a software application running at any device in the distributed system. The AMS application can operate at a computer device, a mobile device, and/or a server device to facilitate distributed access to a software application. The AMS application can support a server-client architecture, where a client device can capture stimulations at client device from accessories and transmit these stimulations to a server or master device. A server-based AMS application can process received client device stimulation inputs and make the processed information available to a software application, such as a gaming application, that is running on the operating system of the server device. The server-based AMS application can halt processing of a software application at the device responsive to a detected request to pause and, subsequently, restart processing of the software application at the device responsive to a received request to resume the software application. The server AMS application can transmit a graphical user interface associated with a software application to a client mobile communication device. The server AMS application can receive and process a stimulation of a remote user input function at the client mobile communication device that the client AMS application sends to the server device. The server AMS application can retrieve at the server device at least one action of a plurality of associable actions responsive to the detected stimulation and can transmit the retrieved action to an operating system of the computer device for use in the software application. The AMS application can thereby provide AMS functionality for remote client accessories, including execution of macros specific to user profiles.

Figure 4:
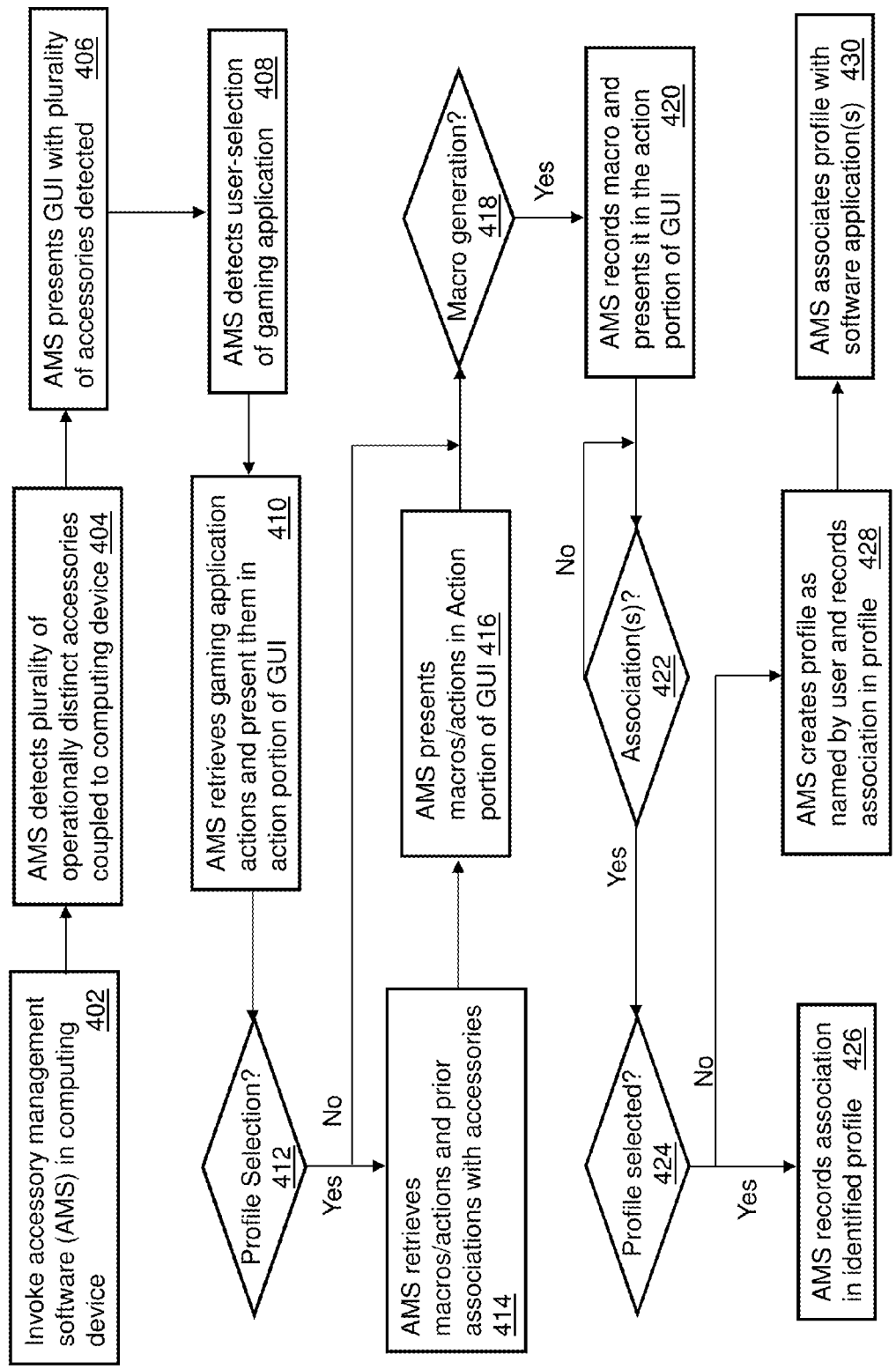
FIGS. 4-6 depict illustrative methods describing the operation of the AMS application.
Figure 5:
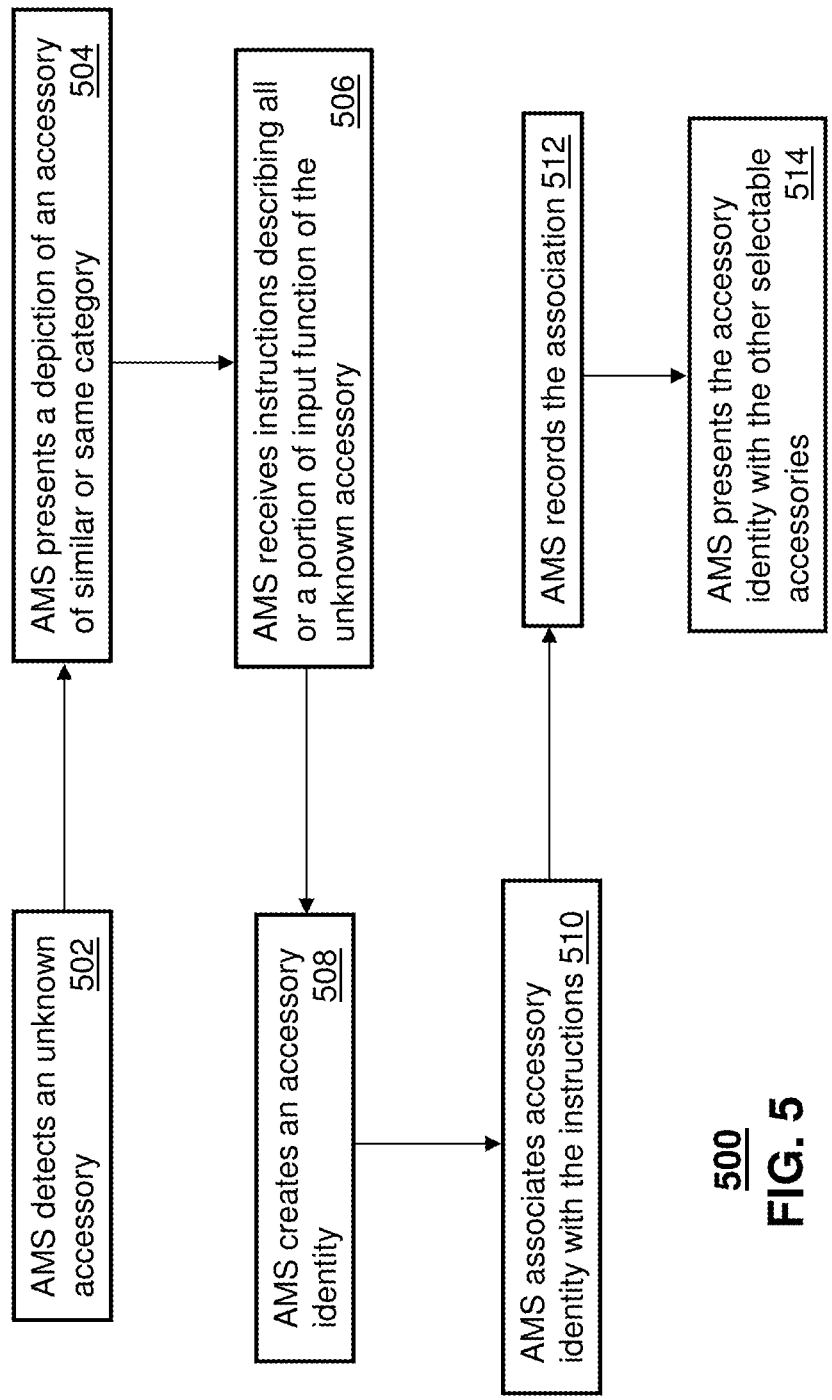
Figure 6:
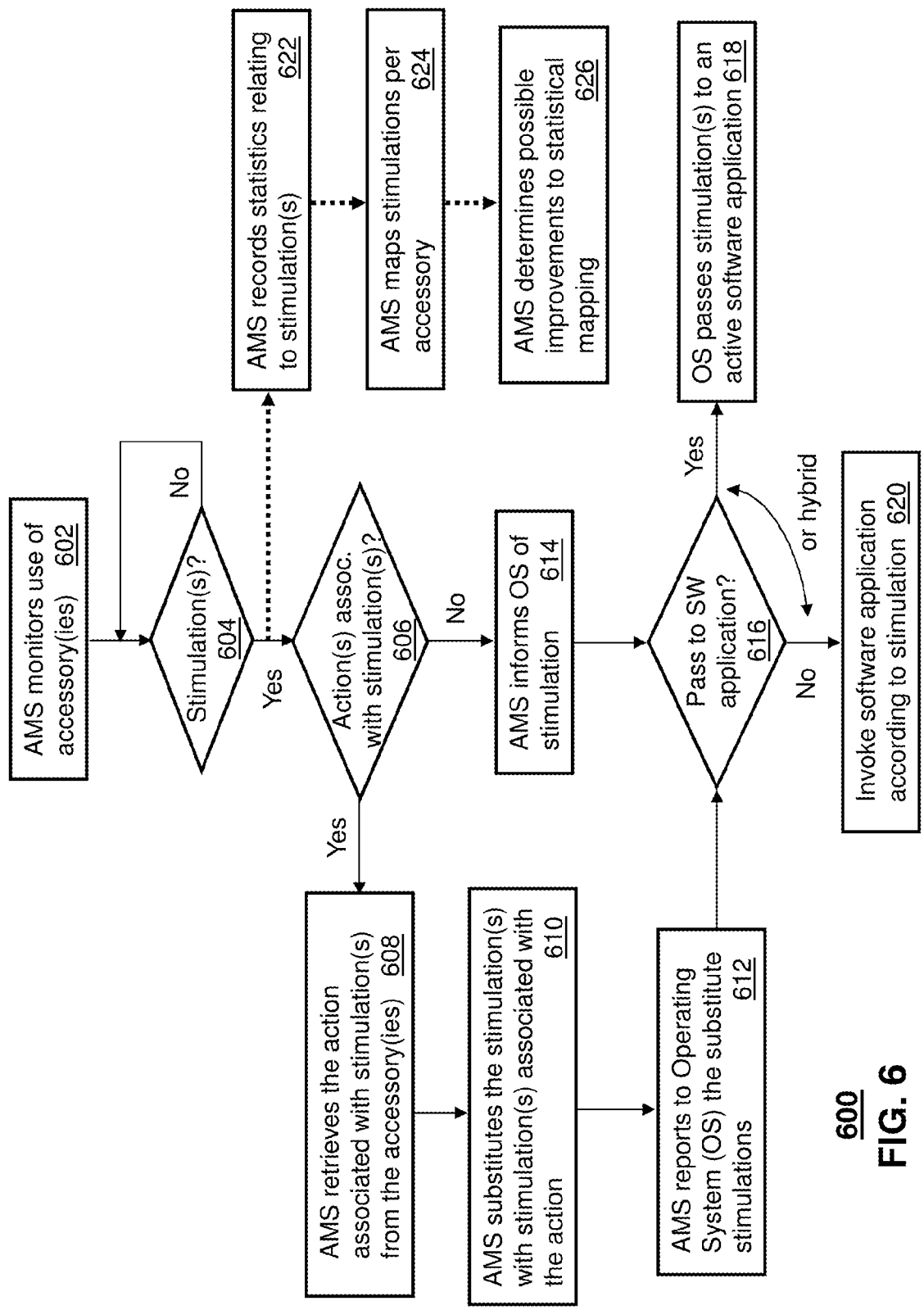

FIGS. 4-6 depict illustrative methods 400-600 describing the operation of the AMS application as shown in FIGS. 1-3. Method 400 can begin with step 402 in which the AMS application is invoked in a computing device. The invocation step can result from a user selection of the AMS application from a menu or iconic symbol presented on a desktop of the computing device by an operating system (OS) managing operations thereof. In step 404, the AMS application can detect, such as by way of drivers in the OS, a plurality of operationally distinct accessories communicatively coupled to the computing device. The accessories can be coupled to the computing device by a tethered interface (e.g., USB cable), a wireless interface (e.g., Bluetooth or Wireless Fidelity—Wi-Fi), a mobile cellular network, or combinations thereof.

In the present context, an accessory can represent any type of device which can be communicatively coupled to the computing device and which can control aspects of the OS and/or a software application operating in the computing device. An accessory can represent for example a keyboard 108, a gaming pad, a mouse 110, a gaming console controller 115, a joystick 116, a microphone, or a headset with a microphone just to mention a few. An accessory can also represent for example, gaming goggles or apparel with sensors. An accessory can represent a virtual accessory operating at a client mobile communication device 114.

The keyboard 108 and gaming pad represent accessories of a similar category since their operational parameters are alike. A mouse 110, on the other hand, represents an accessory having disparate operational parameters from the keyboard or gaming pad. For instance, the operational parameters of a keyboard 108 generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks 116, game controllers 115 or any other input devices represent additional categories of accessories supported by the AMS.

In one embodiment, the AMS application can detect a virtual accessory 114 in the form of a mobile communication device. For example, a mobile communication device 114 can be communicatively coupled to a computing device that is executing the AMS application. For example, the coupling can be through a wireless link, such as Wi-Fi, Bluetooth, or a cellular link. In this embodiment, a graphical user interface on the mobile communication device 114 can depict user input elements corresponding to the emulated accessory, such as a virtual gaming console controller, a virtual gaming pad, or a virtual joystick. For example, the graphical user interface can depict joystick and button elements consistent with a gaming console controller. As the user interacts with the virtual gaming console controller on the virtual accessory mobile communication device 114, user inputs can be captured and converted into stimuli by the mobile communication device 114. The stimuli can be output from the mobile communication device 114 to the AMS application computing device over the communications link. The AMS application can process the received stimuli, as it does stimuli for other accessory devices, as described below. For example, the AMS application can record macro actions corresponding to stimuli from the virtual accessory at the mobile communication device 114. The AMS application can pass the stimuli, or stimuli substitutes, to an operating system of the AMS server or master for use by a software application running at the server or master.

In one embodiment, a server AMS application can detect an accessory that is coupled to a client mobile communication device, where the client mobile communication device is communicatively coupled to the server device that is running the AMS application. For example, a client mobile communication device can communicate with the server AMS application over a wireless interface, such as Wi-Fi, Bluetooth, or a cellular link. In another example, the client mobile communication device can communicate with the AMS application over an Internet Protocol network, where the mobile communication device interfaces to the Internet Protocol network by a wired connection or by a wireless connection, such as Wi-Fi, Bluetooth, or a cellular link.

In one embodiment, AMS client application software can be downloaded or otherwise provisioned to the mobile communication device. For example, an AMS application at a server device can detect a remote accessory, such as gaming console controller 115, that is connected to a client mobile communication device that is further connected to the server device. As the user interacts with the gaming console controller 115 at the mobile communication device, user inputs can be captured and converted into stimuli by the mobile communication device. The stimuli can be output from the mobile communication device to the server AMS application at the computing device over the communications link. The server AMS application can process the received stimuli, as it does stimuli for other accessory device. For example, the server AMS application can record macro actions corresponding to stimuli from the gaming console controller 115 connected to the mobile communication device. The server AMS application can then compare a received stimulation from the mobile communication device against the recorded macros. The server AMS can similarly store and later compare the received stimulations against alternative actions that a user has configured in the user profile. The server AMS application can thereby send to the operating system of the server device default actions associated with the received stimulation, alternative actions associated with the received stimulation, or substitute macros of several actions that are associated, as group, with the received stimulation. The action, or actions, that the server AMS application sends to the operating system can then be used by the software application running at server device.

In step 406, the AMS application presents a GUI 101 such as depicted in FIG. 1 with operationally distinct accessories such as the keyboard 108 and mouse 110. The GUI 101 presents the accessories 108-116 in a scrollable section 117. One or more accessories can be selected by a user with a common mouse pointer. In this illustration, the keyboard 108 and mouse 110 were selected with a mouse pointer for customization. Upon selecting the keyboard 108 and mouse 110 in section 117, the AMS application can present the keyboard 108 and mouse 110 in split windows 118, 120, respectively, to help the user during the customization process.

In step 408, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or mouse 110 to make an association with an input function of one of these accessories. In one embodiment, actions 130 can be associated with input functions of a virtual accessory mobile communication device 114 and/or input functions of remote accessory devices connected to mobile communication devices.

In one embodiment, a user can drag the Melee Attack symbol to a right mouse button thereby causing an association between the selection of the right mouse button and the gaming action of a Melee Attack. When the right button of the mouse 110 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile in step 414. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS. A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, a mouse pad, a pair of gaming goggles, or a gaming accessory, and so on. In another embodiment, macros can be Macros can also be combinations of the above illustrations. Macros can be created from the GUI 101 by selecting a "Record Macro" button 148. The macro can be given a name and category in user-defined fields 140 and 142. Macros can similarly be associated with input functions of a virtual accessory mobile communication device 114 and/or input functions of remote accessory devices connected to mobile communication devices.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing.

Once the macro has been fully defined, selection of button 154 records the macro in step 420. The recording step can be combined with a step for adding the macro to the associable items Actions column 130, thereby providing the user the means to associate the macro with input functions of the accessories.

In step 422, the AMS application can respond to drag and drop associations between actions and input functions of the keyboard 108 and the mouse 110. If an association is detected, the AMS application can proceed to step 424 where it can determine if a profile has been identified in step 412 to record the association(s) detected. If a profile has been identified, the associations are recorded in said profile in step 426. If a profile was not been identified in step 412, the AMS application can create a profile in step 428 for recording the detected associations. In the same step, the user can name the newly created profile as desired. The newly created profile can also be associated with one or more software applications in step 430 for future reference.

The GUI 101 presented by the AMS application can have other functions. For example, the GUI 101 can provide options for layout of the accessory selected (button 122), how the keyboard is illuminated when associations between input functions and actions are made (button 134), and configuration options for the accessory (button 126). Configuration options can include operational settings of the mouse 110 such as Dots-per-Inch or Counts-per-Inch, and so on. The AMS application can adapt the GUI 101 to present more than one functional perspective. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics in relation to the usage of accessories as depicted in FIGS. 2-3. Selecting button 106 can cause the AMS application to adapt the GUI 101 to present promotional offers and software updates.

It should be noted that the steps of method 400 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard, gaming goggles, or gaming accessory from an unknown vendor by way of a communicative coupling to a computing device from which the AMS application operates. The AMS application can detect an unknown virtual accessory emulated on a mobile communication device 114 or an unknown remote accessory device that is connected to a mobile communication device. The AMS application can receive an identity from a keyboard or the operating system. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to a keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device.

FIG. 6 depicts a method 600 for illustrating the AMS application responding to input function stimuli (triggers) of accessories. Method 600 can begin with step 602 in which the AMS application monitors the use of accessories. This step can represent monitoring the stimulation of input functions of one or more accessories communicatively coupled to a computing device from which the AMS application operates. In one embodiment, a physical accessory device can be coupled to a computing device executing the AMS application. In one embodiment, a physical accessory device can by coupled to a mobile communication device that can be further coupled to the computing device executing the AMS application. In one embodiment, a virtual accessory can be emulated by a mobile communication device 114 that can be coupled to the computing device executing the AMS application. The computing device can be a remote server or a local device near the accessories. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. The input functions can also represent button depression at gaming goggles or a gaming accessory. Other existing or future input functions of an accessory detectable by the AMS application are contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 608 where it retrieves the stimulation definition of these actions for each accessory reporting a stimulation event. In step 610, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 610, the AMS application would substitute "Ctrl A" for stimulations consisting of the mouse clicks, navigation and a request for an IM application. The substitute stimulations would then be reported in step 612 to an operating system (OS).

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft™) awaiting stimulation data from the computer system. In this illustration, the macro comprises both stimulation feedback for the active software application and a request to initiate an IM session. Accordingly, the OS conveys in step 618 the mouse stimulation signals to the active software application (e.g., gaming application), and in a near simultaneous fashion invokes the IM session in step 620 with a specific individual (or organization).

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on the depressions of "Ctrl A" has no particular association to an action. In this case, the AMS application passes this stimulation to the OS with no substitutes. In step 616 the OS can determine if this stimulation invokes a new software application in step 620 or is conveyed to the previously initiated software application. All of the above-described steps can be performed, for example, on physical accessories coupled to the computer device executing the AMS application, on physical accessories coupled to mobile communication devices that are coupled to the computer device executing the AMS application, and/or virtual accessories emulated by mobile communication devices coupled to the computer device executing the AMS application.

Contemporaneous to the embodiments described above, the AMS application can also record in step 622 statistics relating to the detected accessory stimulations. A portion of the AMS application can operate as a background process which performs statistical analysis on the stimulations detected. By selecting button 104 in FIG. 1, the AMS application can provide an updated GUI which illustrates the usage of input functions of one or more accessories for which stimulations were detected in step 604. A keyboard accessory is shown in FIG. 2. In this illustration, certain keys (references 205, 206 208, 210) on the keyboard are color-coded to illustrate the frequency of usage of these keys.

A color scale 203 defines the frequency of usage of the input functions of the keyboard. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 208 depict a color coding with the highest detectable usage, while the F7 key (reference 210) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics from a given session.

The GUI of FIG. 2 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 2.

In addition to a symbolic representation as shown in FIG. 2, the AMS application can provide the user a means to visualize raw statistics in a table format such as shown in FIG. 3 by selecting button 212. The table format shows raw data in section 302 and possible suggestions in section 304 for improving user performance which can be generated by the AMS application in step 626. Section 302 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt .> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt .> and <Ctrl A> which can be assigned to keys on the keyboard or left and right buttons of a mouse. The latter suggestion of assigning macros to the mouse can help the user free up his/her left hand.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIG. 1), an understanding of the associations made by other users (e.g., gamers) to improve their performance when controlling the software, and so on. The AMS application can also be operable to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, method 400 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory.

The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 1→layer 2→layer 3→to layer 1→ and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, etc.

In another embodiment, method 400 can be adapted so that a user can define super macros and/or super profiles. A super macro can represent nested macros (combinations of macros). Method 400 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

In yet another embodiment, method 400 can be adapted to establish audio profiles for headset accessories. When a user selects a headset accessory, the GUI 101 can be adapted to provide the user options to establish a sound output (equalizer) setting to optimize performance for a particular gaming application. For instance GUI 101 can present an equalizer so that the user can raise the volume of high frequencies to an enemy's footsteps from a longer distance in a gaming application.

Figure 7:
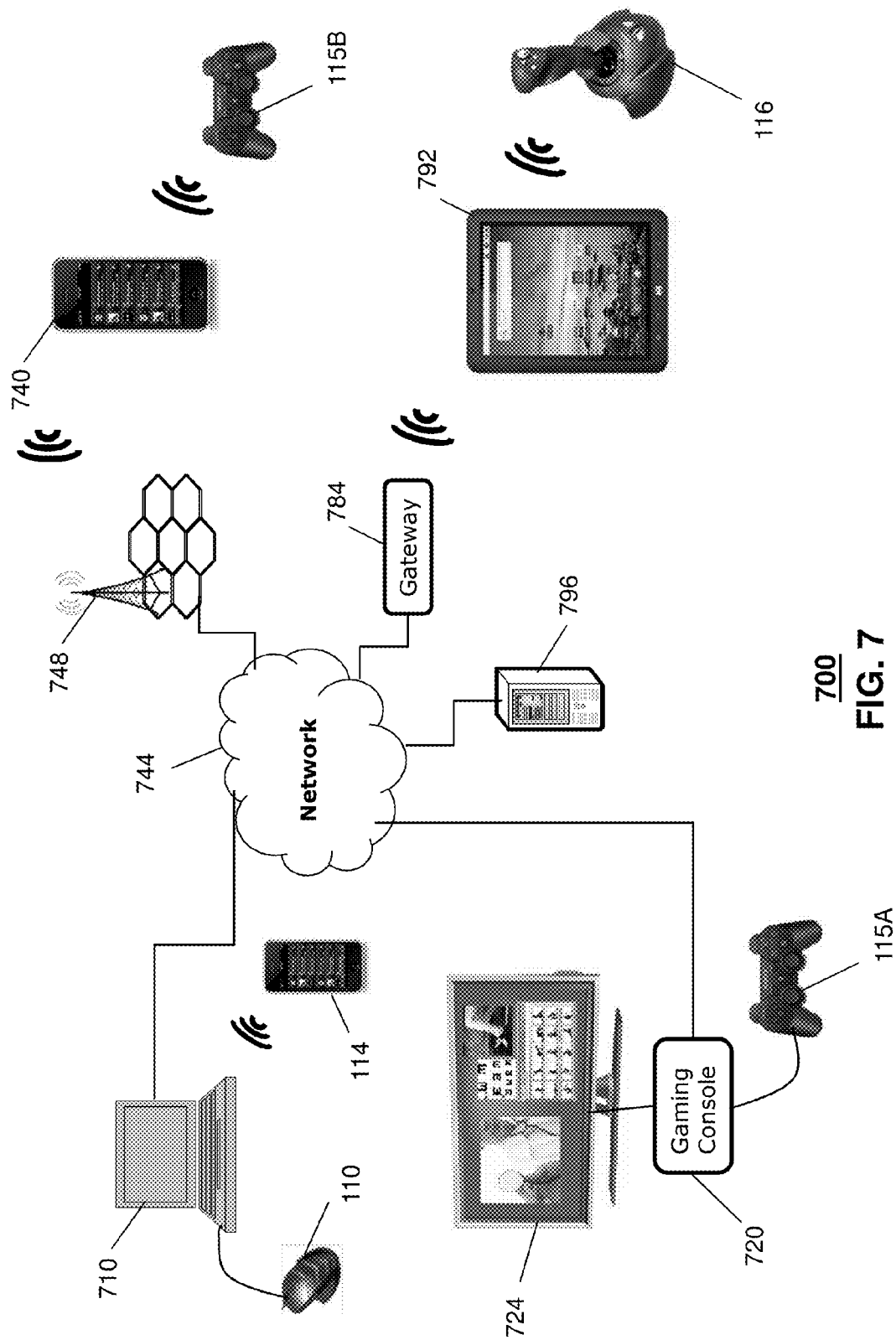
FIG. 7 depicts an illustrative embodiment of a distributed computer system for accessing a software application.

FIG. 7 depicts an illustrative embodiment of a distributed computer system 700 for accessing a software application. System 700 can include two or more communicatively coupled computing devices. For example, the system 700 can include one or more computer devices 710, gaming console devices 720, mobile communication devices 740, and/or mobile computing devices 792, and/or server devices 730. The system 700 can include one or more accessory devices, such as gaming console controllers 115A and 115B and joystick devices 116. The system 700 can include one or more virtual accessory devices 114, such as a controller device that is emulated on a mobile communication device. The several computing devices of the system 700 can be communicatively coupled by connection to a network 744, such as a local area network (LAN) or a wide-area network (WAN). The network 744 can provide access to the Internet. In one embodiment, the two or more computing devices can be directly coupled without a network. For example, two or more computing devices can be communicatively coupled by a wired connection or by a wireless connection, such as a Wi-Fi or Bluetooth connection.

The computer devices 710 can be, for example, laptop computers, desktop computers, or tablet computers. The computer device 710 of the system 700 can process and execute computer instructions from a software application. In one embodiment, the software application is a gaming program, where a user of the computer device 710 can be shown a graphical user interface depicting a gaming situation on a display of, or connected to, the computer device 710. The user of the computer device 710 can interact with the gaming program, to provide navigational and control directives, using any one or a combination of several input devices 110. In one embodiment, the computer device 710 can use the AMS application to monitor and capture functional inputs, or user stimulations, from physical and/or virtual accessories coupled to the computer device 710. For example, the AMS application at the computer device 710 can capture stimulations from a keyboard or touchpad built into the computer device 710. The AMS application can process these stimulations and retrieve associated actions for use by the software application running at the computer device 710. For example, the AMS application at the computer device 710 can capture and process stimulations from a physical accessory, such as a mouse device 110, that is coupled to the computer device 710. For example, the AMS application at the computer device 710 can capture and process stimulations from a virtual accessory, such as a virtual accessory emulated on a mobile communication device 114 that is coupled to the computer device 710.

In one embodiment, an AMS application running at a gaming console 720 can capture and process stimulations from a physical accessory, such as a gaming console controller 115A, that is coupled to the gaming console 720. An AMS application at the gaming console 720 can also capture and process stimulations from a virtual accessory, such as a virtual accessory emulated on a mobile communication device.

In one embodiment, a mobile communication device 740 can be communicatively coupled to the network 744 though a cellular system 748. The mobile communication device 740 can be a client device of an AMS application running on a server device, such as the computer device 710 or the gaming console 720. In one embodiment, a software application, such as a gaming program, can be executed on the sever device 710 or 720. For example, a user can be playing the gaming program World of Warcraft™ at the gaming console 720. The user can select a pause function from the gaming console controller 115A. In one embodiment, the AMS application at the gaming console 720 can detect the PAUSE input from the gaming console controller 115A and can cause the gaming software running at the gaming console 720 to pause.

In one embodiment, the AMS application can cause a user interface prompt to be displayed at a display 724 coupled to the gaming console 720. The prompt can ask if the user would like to resume playing of the game at another device. In one embodiment, the AMS application can enable the user to configure a list of devices that can be used to resume the software application. In one embodiment, a client AMS application can be preloaded onto each device in a list of devices. In one embodiment, a server AMS application at the server device 720 can detect if a selected and detected client device does not currently have the client AMS application. The server AMS application can download the client AMS application onto the client device upon detection. In one embodiment, a user can preselect a particular device for resuming the software application. For example, the user can configure a user profile such that any pause of gaming software, or a particular title, will automatically be resumed at a particular mobile communication device 740.

After a device is selected for resumption of the software application, the server AMS application can cause the server device 710 and 720 to establish a communication link to the mobile communication device 740. Once a communication link is established, the server AMS application can cause the server device 710 and 720 to transmit to the client AMS application at the mobile communication device 740 a graphical user interface associated with the software application and corresponding to the point where the software application was paused. In one embodiment, the graphical user interface can be adapted, or transcoded, to correspond to features and/or limitations of the mobile communication device 740. For example, the server AMS application can adapt, or transcode, the graphical user interface to fit a display size, resolution, or aspect ratio of the mobile communication device 740. The mobile communication device 740 can display the adapted or transcoded graphical user interface associated with the resumed software application.

In one embodiment, the client AMS application at the mobile communication device 740 can monitor user inputs for navigating or controlling the resumed software application running at the computer device 710. For example, the mobile communication device 740 can monitor for a request to resume the software application. If the request to resume is received, then the mobile communication device 740 can send the request to the server device 710 and 720.

In one embodiment, the mobile communication device 740 can be coupled to a local gaming console controller 115B through, for example, wireless communication. A user of the client mobile communication device 740 can navigate and control the software application using the gaming console controller 115B, where the software application is running at the server computer device 710 but is presented locally at a display of the client mobile communication device 740. The client mobile communication device 740 can capture user inputs, or stimulations, from the gaming console controller 115B and can send these stimuli to the server computer device 710. The server AMS application at the server computer device 710 can process the received stimuli to determine associated actions and, if necessary, perform macro operations of multiple actions. The processed stimuli are used to navigate and control the software application running at the server computer device 710. In one embodiment, the client device, such as a smart pad device 792, can be coupled to the network through a gateway or routing device 784. For example, the smart pad device 792 can be coupled to then network by a wireless link.

In one embodiment, the AMS application at the computer device 710 can detect a virtual accessory in the form of a virtual accessory emulated at a mobile communication device 114. For example, the mobile communication device 114 can be communicatively coupled to a computing device executing the AMS application through a wireless link, such as Wi-Fi, Bluetooth, or a cellular link. The mobile communication device 114 can be a client device executing a client version of the AMS application. The virtual accessory emulated by the mobile communication device 114 can be, for example, a virtual gaming console controller, virtual gaming pad, or virtual joystick. In this embodiment, a graphical user interface on the mobile communication device 114 can depict user input elements corresponding to the emulated virtual accessory. For example, the graphical user interface can depict joystick and button elements consistent with a gaming console controller. As the user interacts with the virtual gaming console controller on the mobile communication device 114, user inputs can be captured and converted into stimuli by a client AMS application on the mobile communication device 114. The stimuli can be output from the mobile communication device 114 to the server AMS application computing device over the communications link. The server AMS application can process the received stimuli, as it does stimuli for other accessory devices, as described below. For example, the server AMS application can record macro actions corresponding to stimuli from the virtual accessory mobile communication device 114. The server AMS application can pass the stimuli, or stimuli substitutes, to an operating system of the AMS server for use by a software application running at the server device. The foregoing embodiments are a subset of possible embodiments contemplated by the present disclosure. Other suitable modifications can be applied to the present disclosure.

In one embodiment, a remote server 796 can be included in the system 700. For example, the remote server 796 can be a cloud-based server. The remote server 796 can send communicate with a computer device 710 over a network 744. In one embodiment, the remote server 796 can execute the software application. The remote server 796 can transmit to the computer device 710 a graphical user interface depicting the executing software application. For example, the remote server 796 can stream the graphical user interface to the computer device 710 that then presents the operating software application at a display. In one embodiment, the remote server 796 can receive stimulation inputs from the computer device 710 and can process these stimulation inputs using an AMS executing at the remote server 796.

In one embodiment, the remote server 796 can communicate with a mobile communication device 740. In one embodiment, the remote server 796 can transmit a graphical user interface depicting a virtual accessory at the mobile communication device 740. For example, the remote server 796 can transmit a stream to the mobile communication device 740 that can be depicted as the virtual accessory on a display at the mobile communication device 740. In one embodiment, the remote server 796 can receive a request to pause execution of the software program. In one embodiment, the remote server 796 can respond to a request to pause by pausing the software program. In one embodiment, the remote server 796 can transmit the graphic user interface depicting the executing software program to the mobile communication device 740. In one embodiment, the remote server 796 can receive stimulation inputs from the computer device 710.

Figure 8:
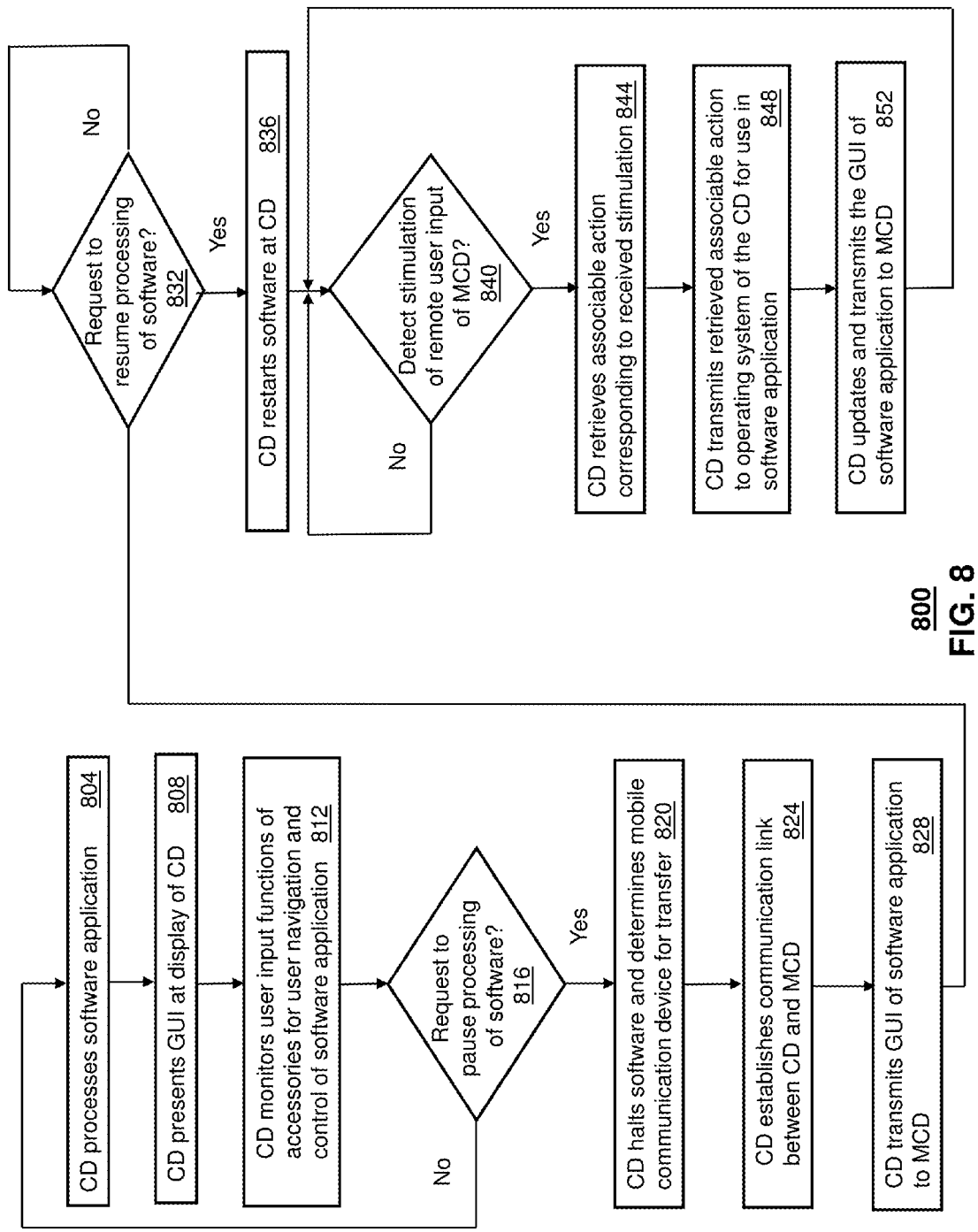
FIG. 8 depicts illustrative embodiments of a method operating in portions of the systems described in FIGS. 1-7.

FIG. 8 depicts an illustrative method 800 that operates in portion of the devices and systems of FIGS. 1-7. Method 800 can begin with step 804 in which a computer device 710 can process a software application. In one embodiment, the computer device 710 can be a personal computer, a laptop computer, and/or a gaming console 720. In one embodiment, the software application can be gaming software.

In step 808, the computer device 710 can present a graphical user interface at a display communicatively coupled to the computer device. In one embodiment, the display can be a display screen associated with a laptop computer 710 or a personal computer. In one embodiment, the display can be a television 724 or other display coupled to a gaming console 720. The display 724 can provide a graphical view of a gaming world, or playing space, for the user to interface with by way of a computer generated character.

In step 812, the computer device 710 can monitor user input functions of accessories 110 coupled to the computer device 710 for user navigation and control of software application. In one embodiment, the computer device 710 can operate an AMS application capable of capturing input function stimuli from accessories 110 coupled to the computer device 710 (or the gaming console 720). In one embodiment, a physical accessory device, such as mouse 110, can be coupled to the computing device executing the AMS application by wired or wireless connection. In one embodiment, a virtual accessory can be emulated by a mobile communication device 114 that is coupled to the computing device executing the AMS application. The computing device 710 can be a remote server or a local device near the accessories 110 and 114. The input functions can correspond to button depressions on a keyboard 108, gaming pad, or navigation device such as a mouse 110. The input functions can also represent navigation instructions such as movements of a mouse 110 or a joystick controller 116.

In step 816, the computer device 710 can detect a request to pause processing of the software application. In one embodiment, the AMS application operating on the computer device 710 (or the gaming console 720) can be configured as a server device that can execute a software application, such as a gaming application, and can continue the operation of the software application at a later time, after a user has transferred physical control from the server device to a client device. For example, a user can be playing a gaming program at the gaming console 720. The user can select a pause function by pressing the PAUSE button on the gaming console controller 115A. In one embodiment, a server AMS application at the gaming console 720 can detect the PAUSE input from the gaming console controller 115A. In embodiment, the server AMS application can detect the PAUSE input as a stimulus input and can compare this stimulation to a user configuration to determine if the PAUSE input is associated with an action or with a macro of a combination of commands to the operating system of the gaming console 720.

If a request to pause processing of the software application is detected, then in step 820, the computer device can halt the software at the computer device and can determine a mobile communication device 740 or 792 for a transfer control of user control. In one embodiment, the gaming console 720 (or computer device 710) can cause the gaming software running at the gaming console 720 to pause. In one embodiment, the server AMS application can cause a user interface prompt to be displayed at a display 724 coupled to the gaming console 720. The prompt can ask if the user would like to resume playing of the game at another device. In one embodiment, the server AMS application can enable the user to configure a list of devices that can be used to resume the software application. In one embodiment, a client AMS application can be preloaded onto each target device in the configuration list. In one embodiment, the server AMS application can detect if a selected client device lacks the client AMS application and can download the client application to the client device, if lacking. In one embodiment, the user can preselect a particular client device for resuming the software application.

In step 824, the computer device can establish a communication link between the server device, such as computer device 710 or gaming console 720 and the client device, such as mobile communication devices 740 and 792. The communication link can be a wired or wireless link and can include cellular communications as well as Internet Protocol communications.

In step 828, a server device 710 can transmit to a mobile communication device 740 a graphic user interface associated with the software application. Once a communication link is established, the AMS application can cause the computer device 710 (or the gaming console 720) to transmit to the mobile communication device 740 a graphical user interface associated with the software application and corresponding to the point where the software application was paused. In one embodiment, the graphical user interface that is sent to the mobile communication device 740 can be adapted, or transcoded, to correspond to features and/or limitations of the mobile communication device 740. For example, the server AMS application can adapt, or transcode, the graphical user interface to fit a display size, resolution, or aspect ratio of the mobile communication device 740. The mobile communication device 740 can display the graphical user interface associated with the resumed software application.

In step 832, the computer device 710 can determine if the mobile communication device 740 has requested to resume the software application. In one embodiment, the mobile communication device 740 can monitor for a request to resume the software application by a user selection of a button at the mobile communication device 740 or a button at a remote accessory 115B that is coupled to the mobile communication device 740. For example, a gaming console controller 115B can be connected, by wired or wireless connection, to the mobile communication device 740 that the user has selected for controlling the software application after the pause event. In one embodiment, the mobile communication device 740 can interpret a functional input, such as a user hitting a START button on the gaming console controller 115B, and can send a request to the computer device 710 to resume the gaming program where the user left off. In one embodiment, the mobile communication device 740 can capture the functional input of the gaming console controller 115B and can pass the input along to the computer device 710 for the server AMS application at the computer device 710 to receive and process. The server AMS application can determine the action that will result from the received START button from the remote gaming console controller 115B, by way of the mobile communication device 740, according to a user configuration at the computer device 710.

If the computer device 710 determines that the mobile communication device 740 has requested to resume the software application, then, in step 836, the computer device 710 can restart the paused software application at the computer device 710. In one embodiment, the computer device 710 can restart the software application exactly where the user left off. In one embodiment, the computer device 710 can restart the software application at an earlier point, such as the last saved location or time point or at a point that is a set number of seconds (e.g., ten seconds) before the point where the user paused the software application. In one embodiment, the computer device 710 can cause a user prompt or a special menu to appear when a user attempts to resume the software program. The prompt or menu can, for example, ask the user to confirm resumption of the software, ask the user for authentication, and/or ask the user if software settings should be changed. For example, the software settings can be changed automatically, or with user approval, to a profile corresponding to the last time the software was remotely run at the mobile communication device 740.

In step 840, the computer device can detect a stimulation of a remote user input at the mobile communication device. In one embodiment, a client AMS application at the mobile communication device 740 can monitor for user inputs for navigating or controlling the resumed software application running at the computer device 710. For example, the client AMS application at the mobile communication device 740 can capture stimulations from a built-in keypad or touch screen. For example, the client AMS application at the mobile communication device 740 can capture stimulations from a remote accessory, such as a gaming console controller 115B. The client AMS application at the mobile communication device 740 can transmit the captured stimulations to the computer device 710 by the communication link between the devices.

If a captured stimulation of a remote user input is detected at the computer device 710, then, in step 844, the server AMS software at the computer device 710 can retrieve an associable action corresponding to the received stimulation. The server AMS application can process the received stimuli as it does stimuli for accessory devices directly coupled to the computer device 710. For example, the server AMS application can compare the received stimulation to a user configuration to determine if there are pre-programmed macro actions or alternative actions associated with the particular stimulation. The server AMS application can thereby convert the received stimulation, or stimulations, into one or more associable actions that are sent to the operating system of the computer device 710 for use by a software application running at the computer device 710 in step 848.

In step 852, computer device 710 can update and transmit the graphical user interface of the software application to the mobile communication device 740. In one embodiment, the computer device 710 continuously streams the graphic user interface of the software application to the mobile communication device 740.

From the foregoing descriptions, it would be evident to an artisan with ordinary skill in the art that the aforementioned embodiments can be modified, reduced, or enhanced without departing from the scope and spirit of the claims described below. In one embodiment, the server AMS application at the computer device can capture stimulations from both a virtual accessory at a mobile communication device 740 and a physical remote accessory 115B coupled to the mobile communication device 740. In one embodiment, the server AMS application at the mobile communication device 740 can record action macros for stimulations received from physical accessories 115B or virtual accessories at a mobile communication device 740. In one embodiment, the server AMS application at the mobile communication device 740 can store an alternative action for a stimulation received from a physical accessory 115B or a virtual accessory at a mobile communication device 740.

In one embodiment, the client AMS application at the mobile communication device 740 can compare captured stimulations, from its physical accessory 115B or from its virtual accessory, to user configurations of macros and/or alternative actions stored at the mobile communication device 740. The mobile communication device 740 can transmit to the computer device 710 a macro action or an alternative action determined from a captured stimulation. In one embodiment, the server application at the computer device 710 and the client AMS application at the mobile communication device 740 can communication though a telephony channel of the mobile communication device 740.

In one embodiment, the server AMS application at the computer device 710 can detect a pause based on a period of user inactivity. The server AMS application at the computer device 710 can present a prompt to the user at the display associated with the computer device 710 asking if the user desires to transfer control of the software application to another device, such as the mobile communication device 740. In one embodiment, the server AMS application at the computer device 710 can cause a text message to be sent to the mobile communication device 740 that is selected as the transfer device.

In one embodiment, the mobile communication device 740 can return the control of the software application back to the computer device 710. For example, an input to the mobile communication device 740 can signal that the user desires to end control of the software application by the mobile communication device 740. A message can be sent from the mobile communication device 740 to the computer device 710. In one embodiment, control of the software application returns to the computer device 710 anytime the mobile communication device 740 is shut off or placed into a low-power state.

In one embodiment, the software application can be associated with a social network application, and the AMS application can enable user input collaboration between the mobile communication device and the computing device in conjunction with the software application being enabled via the social network application.

In one embodiment, a remote server 796 can be included in the system 700. For example, the remote server 796 can be a cloud-based server. The remote server 796 can send communicate with a computer device 710 over a network 744. In one embodiment, the remote server 796 can execute the software application. The remote server 796 can transmit to the computer device 710 a graphical user interface depicting the executing software application. For example, the remote server 796 can stream the graphical user interface to the computer device 710 that then presents the operating software application at a display. In one embodiment, the remote server 796 can receive stimulation inputs from the computer device 710 and can process these stimulation inputs using an AMS executing at the remote server 796.

In one embodiment, the remote server 796 can communicate with a mobile communication device 740. In one embodiment, the remote server 796 can transmit a graphical user interface depicting a virtual accessory at the mobile communication device 740. For example, the remote server 796 can transmit a stream to the mobile communication device 740 that can be depicted as the virtual accessory on a display at the mobile communication device 740. In one embodiment, the remote server 796 can receive a request to pause execution of the software program. In one embodiment, the remote server 796 can respond to a request to pause by pausing the software program. In one embodiment, the remote server 796 can transmit the graphic user interface depicting the executing software program to the mobile communication device 740. In one embodiment, the remote server 796 can receive stimulation inputs from the computer device 710.

Figure 9:
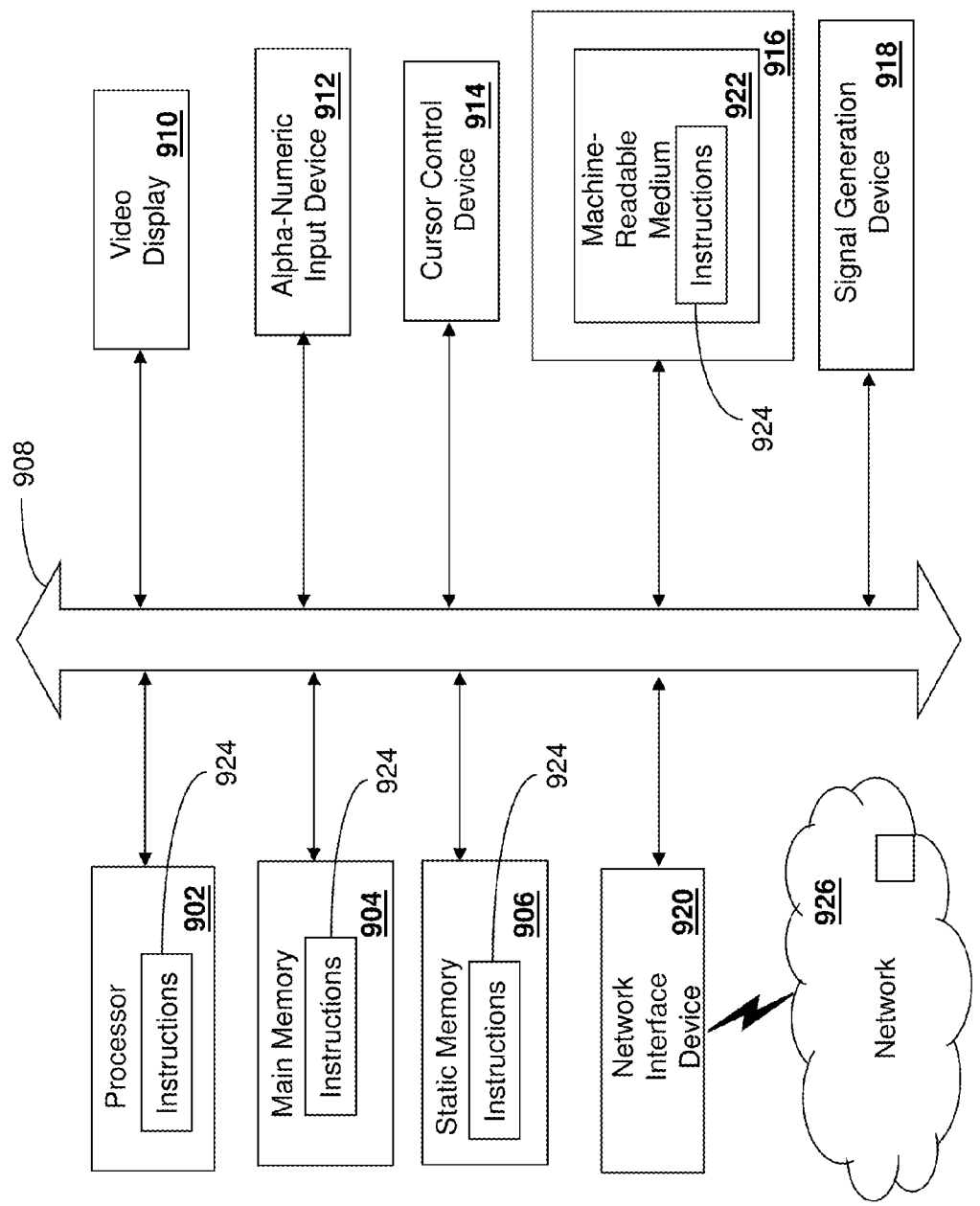
FIG. 9 depicts an illustrative diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal displays (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

restarting, by a system comprising a processor, executing of a software application responsive to a request from a mobile communication device to resume the software application following a pause in the executing of the software application;

transmitting, by the system, a graphical representation of the software application to the mobile communication device wherein the graphical representation is presented at a display of the mobile communication device;

receiving, by the system, an indication from the mobile communication device of a stimulation of a remote user input function at the mobile communication device, wherein the stimulation is caused by a gaming control that is communicatively coupled to the mobile communication device for controlling the software application;

retrieving, by the system, an action of a plurality of associable actions the action corresponds to the stimulation responsive to the stimulation that is detected; and providing, by the system, the action that is retrieved to an operating system for use in the software application.

2. The method of claim 1, wherein the pause in the executing of the software application is responsive to a request that is received from the mobile communication device.

3. The method of claim 1, further comprising:

transmitting, by the system, a graphical user interface to the mobile communication device, wherein the graphical user interface represents a virtual accessory for navigation and control of the software application.

4. The method of claim 3, wherein the graphical user interface is adapted to conform to a capability of the mobile communication device.

5. The method of claim 1, wherein the software application is a gaming application which invokes a gaming feature according to the stimulation.

6. A non-transitory computer-readable storage medium, comprising computer instructions, which when executed by a processor, cause the processor to perform operations comprising:

executing a software application at a computer device;

detecting a request to pause the software application at the computer device;

responsive to the request to pause, halting the executing of the software application at the computer device;

transmitting a graphical user interface associated with the software application to a mobile communication device;

receiving from the mobile communication device a request to resume the software application;

responsive to the request to resume the software application, restarting the execution of the software application at the computer device;

transmitting a graphical representation of the software application to the mobile communication device, wherein the graphical representation is presented at a display of the mobile communication device;

receiving an indication from the mobile communication device of a stimulation of a remote user input function at the mobile communication device, wherein the stimulation is caused by a gaming control that is communicatively coupled to the mobile communication device for controlling the software application;

responsive to the stimulation that is detected, retrieving at the computer device an action of a plurality of associable actions, wherein the action corresponds to the stimulation; and providing the action that is retrieved to an operating system of the computer device for use in the software application.

7. The non-transitory computer-readable storage medium of claim 6, wherein the operations farther comprise:

responsive to the request to pause, initiating a communication link between the computer device and the mobile communication device; and transmitting the graphical user interface associated with the software application to the mobile communication device by way of the communication link.

8. The non-transitory computer-readable storage medium of claim 6, wherein the operations further comprise:

transmitting a second graphical user interface to the mobile communication device, wherein the second graphical user interface comprises the plurality of associable actions and a plurality of remote accessories operable for communicative coupling to the mobile communication device and wherein the plurality of remote accessories are operable for remote navigation and control of the software application of the computer device;

receiving from the mobile communication device a selection associating the action of the plurality of associable actions with the remote user input function for one accessory of the plurality of remote accessories; and recording the association of the action and the remote user input function.

9. The non-transitory computer-readable storage medium of claim 6, wherein the operations further comprise:

transcoding the graphical user interface to conform a capability of the mobile communication device to generate a transcoded graphical user interface; and streaming the transcoded graphical user interface to the mobile communication device.

10. The non-transitory computer-readable storage medium of claim 6, wherein the operations further comprise:

adapting audio data associated with the software application to a capability of the mobile communication device to generate adapted audio data; and transmitting the adapted audio data to the mobile communication device.

11. The non-transitory computer-readable storage medium of claim 6, wherein the software application is a gaming application which invokes a gaming feature according to the action or an aspect of the action provided to the operating system.

12. The non-transitory computer-readable storage medium of claim 6, wherein the operations further comprise:

recording a sequence of remote user input function stimuli from the mobile communication device; and associating the sequence of remote input function stimuli to a macro.

13. The non-transitory computer-readable storage medium of claim 12, wherein the macro corresponds to one of the plurality of associable actions.

14. A computing device, comprising a memory coupled to a processor, wherein the memory comprises computer instructions, which when executed by the processor, facilitate performance of operations comprising:

initiating communications with a software application;

detecting a request to transfer navigation and control of the software application to a mobile communication device;

responsive to the request to transfer navigation and control, initiating a communication link to the mobile communication device;

receiving an first indication from the mobile communication device of a first stimulation of a remote user input function associated with the mobile communication device by way of the communication link to control the software application;

providing, to the software application, first stimulation data that is associated with the first stimulation that is detected;

transmitting a graphical representation of the software application to the mobile communication device, wherein the graphical representation is presented at a display of the mobile communication device;

receiving a second indication from the mobile communication device of a second stimulation that is caused by a gaming controller that is coupled to the mobile communication device for controlling the software application; and providing, to the software application, second stimulation data that is associated with the second stimulation.

15. The computing device of claim 14, wherein the operations further comprise transmitting a first video stream associated with the software application to the mobile communication device by way of the communication link.

16. The computing device of claim 14, wherein the operations further comprise generating the second stimulation data provided to the software application from a substitute stimulation that is associated with the second stimulation.

17. The computing device of claim 14, wherein the operations further comprise:
   transmitting, to the mobile communication device, a graphical user interface representative of a control accessory for remote navigation and control of the software application; and
   receiving, from the mobile communication device, the remote user input function that is generated from manipulations of the control accessory.

18. The computing device of claim 14, wherein the software application is executed by one of the processor or another computing device.

19. The computing device of claim 14, wherein the operations further comprise:
   adapting audio data associated with the software application to a capability of the mobile communication device to generate adapted audio data; and
   transmitting the adapted audio data to the mobile communication device.

20. The computing device of claim 14, wherein the software application is a gaming application which invokes a gaming feature according to the stimulation data.

21. The computing device of claim 14, wherein the operations further comprise:
   recording a sequence of remote user input function stimuli from the mobile communication device; and
   associating the sequence of remote input function stimuli to a macro.

22. The computing device of claim 21, wherein the macro corresponds to one of a plurality of associable actions, and wherein the first stimulation data comprises the action.

* * * * *